United States Patent [19]

Watanabe et al.

[11] Patent Number: 4,622,112

[45] Date of Patent: Nov. 11, 1986

[54] PROCESS FOR PREPARING CHLORINATED POLYVINYL AROMATIC COMPOUNDS

[75] Inventors: Hiroyuki Watanabe; Toru Seita, both of Yamaguchi, Japan

[73] Assignee: Toyo Soda Manufacturing Co., Ltd., Yamaguchi, Japan

[21] Appl. No.: 713,380

[22] Filed: Mar. 19, 1985

[30] Foreign Application Priority Data

Mar. 19, 1984 [JP] Japan .................................. 59-51069
Mar. 19, 1984 [JP] Japan .................................. 59-51071

[51] Int. Cl.$^4$ .............................................. C25B 3/06
[52] U.S. Cl. ...................................................... 204/81
[58] Field of Search ................................ 204/81, 59 B

[56] References Cited

U.S. PATENT DOCUMENTS 4,414,065  11/1983  Watanabe ............................. 204/81
4,495,036   1/1985  So ........................................ 204/59 R

*Primary Examiner*—R. L. Andrews
*Attorney, Agent, or Firm*—Sughrue, Mion, Zinn, Macpeak and Seas

[57] ABSTRACT

A process for the preparation of chlorinated polyvinyl aromatic compound is described, comprising the steps of: (1) in an aromatic organic solvent, forming a solution of an aromatic compound represented by formula (I):

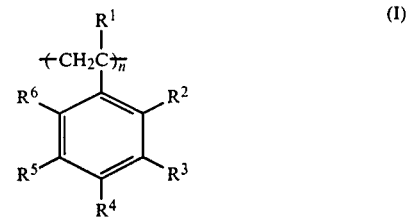

wherein each of $R^1$, $R^2$, $R^3$, $R^4$, $R^5$, and $R^6$ is selected from hydrogen and an alkyl groups containing from 1 to 6 carbon atoms, and $R^4$ and $R^5$, or $R^5$ and $R^6$ can together form a ring by

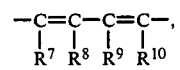

wherein each of $R^7$, $R^8$, $R^9$, and $R^{10}$ is selected from hydrogen and an alkyl group containing from 1 to 6 carbon atoms, and n has an average value of from 50 to 30,000; and (2) subjecting the solution to electrolysis reaction in the pressure of an aqueous solution containing chloride ions.

6 Claims, No Drawings

PROCESS FOR PREPARING CHLORINATED POLYVINYL AROMATIC COMPOUNDS

FIELD OF THE INVENTION

The present invention relates to a process for preparing chlorinated polyvinyl aromatic compounds, and particularly relates to a process in which a polyvinyl aromatic compound (hereinafter more briefly referred to simply as the polymer) is dissolved into an organic aromatic solvent, and an electrolytic reaction is performed, to prepare a chlorinated polyvinyl aromatic compound (hereinafter more briefly referred to simply as the chlorinated polymer) having good solvent resistance, fusion resistance, thermal resistance, and burning resistance, and having substantially the same molecular weight distribution as the polymer.

BACKGROUND OF THE INVENTION

Chlorinated polymers are useful as a burning-resistant material, and chlorinated polymers having a narrow molecular weight distribution are useful as a radiation-sensitive resist material.

It is known to improve certain properties of polymers by chlorinating the same. For example, a process for chlorinating polystyrene in a solvent such as carbon tetrachloride and in the presence of a catalyst, such as, for example, a peroxide such as benzoyl peroxide or the like, by using a chlorinating agent such as chlorine, N-chlorosuccinimide, sulfuryl chloride, etc., is described, for example, in Japanese Patent Application (OPI) No. 16995/1973, U.S. Pat. No. 3,812,061, etc. (The term "OPI" as used herein refers to a "published unexamined Japanese patent application".)

Chlorinated polyvinyltoluene having a narrow molecular weight distribution, which is useful as a radiation-sensitive resist material having high resolution and superior dry-etching resistance, is described, for example, in Japanese Patent Application (OPI) No. 187923/1983, etc.

These methods, however, have disadvantages such as depolymerization is induced in chlorination, the molecular weight of the polymer is remarkably lowered, and the mechanical properties of the polymer are deteriorated. For example, see *Journal of Applied Polymer Science*, Volume 12, Page 2065 (1968).

A technique where a polymer, as a raw material, can be chlorinated so as to be provided with burning resistance, fusion resistance, thermal resistance, etc., without damaging its desirable properties, has been desired for a long time.

A process has been proposed for preparing chlorinated polymers with only a slight disturbance in the molecular weight distribution of the polymers, is described in Japanese Patent Application (OPI) No. 42779/1983 (corresponding to U.S. Pat. No. 4,414,065). According to the method described in U.S. Pat. No. 4,414,065, it is, however, necessary to isolate the polymers and, hence, it is impossible to prepare highly chlorinated polymers, i.e., polymers which contain more than 0.5 mol of chlorine per unit monomer, without disturbing the molecular weight distribution of the mother polymer.

SUMMARY OF THE INVENTION

As the result of investigation to improve the above-mentioned process, we found aromatic organic solvents are very useful both to prepare polymers with a narrow molecular weight distribution and to prepare chlorinated polymers with almost the same molecular weight distribution as that of the mother polymers. That is, we found a process to prepare chlorinated polymers without isolating the mother polymers.

According to the present invention, chlorinated polyvinyl aromatic compounds with almost the same molecular weight distribution as their mother polymers are easily prepared by (1) in an aromatic organic solvent, forming a solution of polymer and (2) subjecting the resulting solution to electrolytic reaction in the presence of an aqueous solution containing chloride ions. p Furthermore, the content of chlorine atoms in the chlorinated polymers is easily controlled by varying an amount of electricity used.

DETAILED DESCRIPTION OF THE INVENTION

The polymer to be used according to the present invention is represented by formula (I)

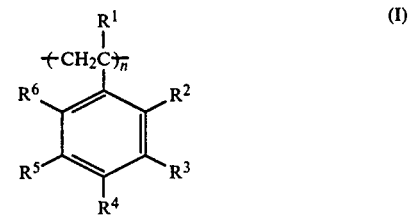

wherein each of $R^1$, $R^2$, $R^3$, $R^4$, $R^5$, and $R^6$, which may be the same of different, is selected from hydrogen and an alkyl group containing from 1 to 6 carbon atoms, and $R^4$ and $R^5$, or $R^5$ and $R^6$ can together form a ring by

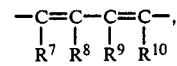

wherein each of $R^7$, $R^8$, $R^9$, and $R^{10}$, which may be the same or different, is selected from hydrogen and an alkyl group containing from 1 to 6 carbon atoms, and n has an average value of from 50 to 30,000. Examples of the polymer include polystyrene, polyvinyltoluene, polyvinylxylene, poly-α-methylstyrene, polydivinylbenzene, polyvinylnaphthalene, polyvinylmethylnaphthalene, etc.

According to a preferred embodiment of the present invention, the solution of step (1) is formed by polymerizing vinyltoluene monomer in the presence of an organometallic compound represented by RM, wherein R is selected from an alkyl group, an aryl group and an aralkyl group, and M is selected from lithium, sodium and potassium, and the solution is then subjected to electrolytic reaction in the presence of an aqueous solution containing chloride ions. In this method, chlorinated polyvinyltoluene having substantially the same molecular weight distribution as that of polyvinyltoluene can be easily prepared.

Furthermore, the content of chlorine atoms in the chlorinated polymer can be easily controlled, e.g., only by varying the amount of electricity passed.

An aromatic compound which is capable of dissolving the polymer and which does cause the polymer to separate out when the polymer is dissolved and mixed with an aqeuous solution containing chloride ions may be used as the aromatic organic solvent. Examples include benzene, t-butyl benzene, chlorobenzene, anisole, etc. Benzene is preferred.

The amount of the aromatic solvent used according to the present invention is generally from 1000 to 1, and preferably from 500 to 20, parts by volume per weight part of the polymer.

As the source of chloride ions in the aqueous solution containing chloride ions, hydrochloric acid or a salt containing chloride ions may be used. As a salt of this kind, it is satisfactory if the same is water soluble and electrically conductive so the same will act as a support electrolyte to thereby permit one to effect electrolytic reaction, and, for example, metallic salts such as lithium chloride, sodium chloride, potassium chloride, calcium chloride, ferric chloride, cobalt chloride, copper chloride, and the like, and ammonium salts such as ammonium chloride, tetramethylammonium chloride, tetraethylammonium chloride, tetrabutyl ammonium chloride, and the like, can be listed. Hydrochloric acid is preferable.

The amount of chloride ions in the aqueous solution is sufficient if it is more than three equivalents of chloride ions based on the amount of chlorine atoms in the chlorinated polymer to be prepared. That is, in step (2) the chloride ion becomes the chlorinating agent.

At that time, although the preparation can be effected with the pH of the aqueous solution being not larger than 7, it is preferable that the pH be not larger than 5. The higher the pH value, the more difficult the progress of the electrolytic chlorinating reaction becomes.

In order to adjust the value of the pH of the aqueous solution, for example, mineral acids such as sulfuric acid, phosphoric acid, or the like, or organic acids such as formic acid, acetic acid, propionic acid, benzene sulfonic acid, p-toluene sulfonic acid, or the like, may be added in addition to the salt as described above with sulfuric acid being preferred.

Further, in order to improve the electrical conductivity of the aqueous solution, for example, inert salts, which are inactive with respect to the reaction, such as sodium tetrafluoroborate, sodium sulfate or p-toluene sulfonic acid tetrabutylammonium can be added.

Although the concentration of the electrolyte in the aqueous solution is generally from 10 to 60 weight %, it is preferably from 20 to 50 weight %.

Conventionally, it is known that when current is passed through a system wherein an aromatic compound such as benzene is present with acidic electrolyte such as a 10% solution of sulfuric acid solution, oxidation of the benzene proceeds to generate benzoquinone, or the like.

On the other hand, according to the present invention, is possible to perform chlorination of a polymer without such a reaction as described above.

Although the reason for this is not completely clear, it is believed that chloride ions exist in an aqueous solution used according to the present invention and the chloride ions, which have a decomposition voltage lower than the aromatic compound, are subjected to an electrode reaction prior to the latter so that the chlorination reaction proceeds prior to oxidation of the aromatic ring.

The present invention can be practiced in both a batch and a continuous manner. The aromatic organic solution may be used in an amount of from 1 to 500 parts by volume, preferably from 10 to 300 parts by volume, per 100 parts by volume of the aqueous solution.

If the amount of the organic phase in the electrolytic cell becomes high, the resistance of the electrolytic solution is disadvantageously increased, while if the organic phase becomes too low, the polymer chlorinating current efficiency is disadvantageously lowered.

Electrodes which are used in a conventional electrolytic reaction and which are inert with respect to the reaction system in question may be used as the electrodes according to the present invention. Examples of cathodes include carbon, graphite, inert metals such as iron, platinum, stainless steel, lead, nickel, and the like, alloys of such inert metals, a support such as titanium or tantalum covered with such inert metals, etc. Examples of anodes include carbon, graphite, platinum, lead dioxide, and the like, or a support such as titanium, tantalum, or the like, covered with platinum, lead dioxide, ruthenium oxide, or the like.

The current density in the present invention is selected to be from 0.1 mA/cm$^2$ to 500 mA/cm$^2$, preferably from 1 mA/cm$^2$ to 300 mA/cm$^2$.

Although the process of the present invention is ordinarily carried out at room temperature (about 20° C.), it can be performed at any temperature which is not higher than 100° C. and in which agitation and mixing of the water phase and the organic phase can be performed.

As to the pressure, the invention can be practiced under conditions of elevated pressure or reduced pressure, depending upon the requirements of the situation.

In the chlorination of such polymers, cleavage of carbon-carbon bonds of the polymer is apt to occur if excess free chlorine exists in the reaction system, particularly in the organic phase. Such cleavage is frequently recognized in chlorinating polymers having a molecular weight of 100,000 or more, or in chlorinating polymers to a high degree.

Accordingly, in order to remove free chlorine, it is preferable to blow an inert gas such as nitrogen, argon, or the like, into the reaction system, or to perform the reaction under conditions of reduced pressure.

The electrolytic cell used in the present invention may be any one of a non-diaphragm type electrolytic cell and a diaphragm type electrolytic cell. In the case of using the diaphragm-type electrolytic cell, the reaction is conducted in an anode chamber.

It is preferable to sufficiently agitate the organic phase and the water phase so as to obtain optimum results in the reaction in question.

According to the present invention, it is possible to easily prepare chlorinated polymers in such a manner that polymer is dissolved into a solvent and an electrolytic reaction is performed at room temperature or in the vicinity thereof in the presence of an aqueous solution containing chloride irons, and, further, it is possible to prepare a polymer having the desired chlorination degree by varying the amount of electricity passed.

Further, solvents as are used in the conventional preparation of polymers may also be used in the present invention. Accordingly, it is also possible to practice the present invention in such a manner that polymerization is performed in a solvent and the polymer solution adjusted to a predetermined polymer concentration without isolating the polymer. Although the concentration of the polymer depends on its molecular weight and the content of chlorine atoms in the chlorinated polymer to be prepared, the concentration of the polymer is ordinarily adjusted to be from 0.5 to 20 wt%.

According to the preferred embodiment with respect to the polyvinyltoluene, the polymerizing step may be performed by an conventional anionic polymerization process. That is, vinyltoluene monomers can be used for the polymerization after they have been dehydrated in vacuo or in an inert gas flow by a suitable dehydrating agent and then distilled.

As a solvent for the polymerization in this preferred embodiment, any aromatic organic solvent is acceptable provided that it does not prevent or interfere with anionic polymerization and the electrolytic chlorination of the polymer, and that the produced polymers are sufficiently soluble therein. For example, aromatic organic solvents such as benzene, t-butylbenzene, etc. can be used. Those solvents are generally refined to be used for anionic polymerization.

As a polymerization initiator for this preferred embodiment, an organometallic compound represented by the formula RM, in which R is selected from an alkyl group, an aryl group, and an aralkyl group, and M is selected from lithium, sodium, and potassium can be used. Examples of such organometallic compounds include, for example, butyl lithium, sodium naphthalene, sodium anthracene, sodium biphenyl, phenylisopropyl potassium α-methylstyrene potassium tetramer, etc.

The polymerization according to this preferred embodiment of the present invention can be performed such that, ordinarily, the initiator, which has been adjusted to have a proper concentration in accordance with the amount of impurities in the polymerizing system containing the vinyltoluene monomers and the polymerizing solvent and the value of molecular weight of the target polymer to be prepared, is added in a high vacuum or in an inert gas flow by using, for example, an evacuation burette, or the like, while sufficiently agitating the interior of the polymerizing system.

It is preferable to select the preparation concentration of the vinyltoluene monomers to be from 0.5 to 20 weight percent, in accordance with the value of molecular weight of the polymers intended to be produced.

Although there is no particular limit as to the polymerization temperature, it is preferable to perform the polymerization at a temperature not higher than 50° C.

The polymerization as described above can be easily stopped by adding lower alcohols containing from 1 to 6 carbon atoms.

The thus obtained solution of the polymer can be used in the next chlorinating step after it has been adjusted such that the concentration of the polymers is from 0.5 to 20 weight percent in accordance with the molecular weight.

Chlorination of the polymers can be achieved such that the solution of the polymers with its concentration suitably adjusted in accordance with the molecular weight and an aqueous solution containing chloride ions are prepared in an electrolytic cell and a current is passed therethrough in an amount required to obtain the chlorinated polyvinyltoluene having the desired chlorine content, while agitating.

According to the present invention, depolymerization of the polymer, such as is found with a conventional chlorinating method, is hardly found, and it is possible to prepare a chlorinated polymer having substantially the same molecular weight distribution as the raw material polymer.

Next, referring to the examples, the present invention will be described more in detail.

In the present examples, the heterogeneity index defined by the ratio (Mw/Mn) of the weight average molecular weight (Mw) to the number average molecular weight (Mn) was determined by gel-chromatography (produced by Toyo Soda Mfg. Co., Ltd.).

EXAMPLE 1

A solution in which 0.75 g of polystyrene (Mw=43,000, Mw/Mn=1.01/1) was dissolved in 15 ml of benzene and 15 ml of 35% hydrochloric acid was put into a 50 ml beaker type electrolytic cell provided with a nitrogen inlet tube and a Dimroth condenser; two platinum electrodes (0.7$\phi$×300 mm) were inserted; the electrolyte was well mixed by a magnetic stirrer and a predetermined current of 0.5 A was passed therethrough for one hour while flowing nitrogen through the upper portion of the Dimroth condenser. During the electrolysis, the terminal voltage of the electrodes varied from 2 to 3 V, and the reaction temperature was 20° C. After completion of the reaction, the organic phase was separated and poured into 10 ml of methanol, thereby obtining 0.98 g of chlorinated polystyrene. Mw/Mn was equal to 1.01/1, and the chlorine content of the chlorinated polystyrene was 24.8%. The proton nuclear magnetic resonance spectrum of the chlorinated polystyrene (solvent: CDCl$_3$, internal standard; TMS) showed a broad peak at δ3.8 ppm which was attributed to a methine proton formed by chlorination of methylene group, in addition to the peaks attributed to polystyrene.

EXAMPLES 2 TO 5

These Examples were performed in the same manner as Example 1, except that the molecular weight and preparation weight of polystyrene were changed, the current value was set to 0.3 A, and the amount of current passed was set to 2.5 F per unit styrene monomer. The results are shown in Table 1. The terminal voltage varied from 1.5 to 3.5 V in each case.

TABLE 1

| | Prepared Polystyrene | | | Chlorinated Polystyrene | | |
|---|---|---|---|---|---|---|
| Example No. | Prepared weight (g) | Molecular weight (Mw) | Heterogeneity Index (Mw/Mn) | Yield (g) | Heterogeneity Index (Mw/Mn) | Chlorine Content (%) |
| 2 | 0.45 | 1.07 × 10$^5$ | 1.01/1 | 0.55 | 1.01/1 | 22.2 |
| 3 | 0.45 | 1.86 × 10$^5$ | 1.07/1 | 0.56 | 1.07/1 | 23.0 |
| 4 | 0.15 | 4.22 × 10$^5$ | 1.05/1 | 0.17 | 1.06/1 | 17.8 |
| 5 | 0.15 | 7.75 × 10$^5$ | 1.01/1 | 0.16 | 1.02/1 | 11.5 |

EXAMPLE 6

0.87 g of chlorinated polystyrene was obtained in the same manner as the Example 1, except that the solvent was changed to t-butylbenzene. During the electrolysis, the terminal voltage of the electrodes varied from 1.5 to 2.5 V. Mw/Mn was equal to 1.01/1, and the chlorine content was 15.5%.

EXAMPLE 7

1.00 g of chlorinated polystyrene was obtained in the same manner as the Example 1, except that a graphite cathode and anode (15 mm(W)×30 mm(L)×2 mm(T)) were employed. The terminal voltage varied from 2.0 to 4.0 V. Mw/Mn was equal to 1.02/1. The chlorine content was 23.8%.

EXAMPLE 8

0.82 g of chlorinated poly-α-methyl styrene was obtained in the same manner as in Example 1, except that 0.75 g of poly-α-methylstyrene (Mw=40,000, Mw/Mn=1.05) was used as the polymer. The terminal voltage varied from 1.5 to 3.2 V. Mw/Mn was equal to 1.05/1. The chlorine content was 11.3%.

EXAMPLE 9 p-Vinyltoluene monomer and benzene were purified by dehydrating with a complex of sodium benzophenone and then distilled in a vacuum of $10^{-5}$ mmHg and the polymerization reaction was carried out in a sealed system. To a solution of 20 g of p-vinyltoluene in 500 ml benzene, 2.6 ml of a hexane solution of sec-butyl lithium (concentration: $5.0 \times 10^{-5}$ mol/ml) was added with stirring.

Polymerization was carried out for two hours at 30° C. and then polymerization was stopped by adding 2 ml of methanol to the reaction mixture. GPC/light scattering measurement of the obtained polymer showed that the weight average molecular weight (Mw) was $1.7 \times 10^5$, and the heterogeneity index (Mw/Mn) was 1.04/1.

9 ml of the above-mentioned polymer solution, 6 ml of benzene and 15 ml of concentrated hydrochloric acid (ca. 35 wt%) were set in an electrolytic cell having a side arm. Two platinum coiled electrodes (0.7φ×30 mm) were used as the electrodes. Electrolysis was carried out by a constant current electrolysis method (0.3 A) under a nitrogen atmosphere for 50 min. During the electrolysis, the terminal voltage of the electrodes was 2.0 V.

After completing electrolysis, the organic solution was poured into 100 ml of methanol, and then 0.55 g of chlorinated poly-p-vinyltoluene was obtained. As the result of elemental analysis, it was found that the chlorine atom content was 21.2% and the chlorination ratio, which was defined as the number of chlorine atoms per p-vinyltoluene unit, was 0.89. As a result of GPC measurement, the heterogeneity index was substantially the same as that of the raw polymer. The proton nuclear magnetic resonance spectrum of this chlorinated polymer showed a peak at δ3.8 ppm which can be attributed to a methine proton formed by chlorination of a methylene group, and a peak at δ4.5 ppm which was attributed to a methylene proton formed by chlorination of a methyl group, in addition to the peaks attributed to the raw poly-p-vinyltoluene.

EXAMPLE 10

Polymerization was performed in the same manner as in Example 9, except that 11 ml of a hexane solution of sec-butyl lithium (concentration $5.0 \times 10^{-5}$ mol/ml) was used, and a solution of poly-p-vinyltoluene was obtained. The weight average molecular weight of the poly-p-vinyltoluene was $4.2 \times 10^4$ and the heterogeneity index was 1.02. Chlorination was performed in the same manner as in Example 9 using 15 ml of solution of a the polymer except that the current value was 0.5 A, and 0.97 g of chlorinated poly-p-vinyltoluene was obtained. The chlorine content was 44.3% and the chlorination rate was 1.16. The heterogeneity index was 1.02. The terminal voltage was 2.0 V during the electrolysis.

EXAMPLE 11

0.45 g of chlorinated poly-p-vinyltoluene was obtained in the same manner as in Example 9, except that no agitation of the electrolytic solution was performed in the chlorinating step. The chlorine content was 8.7%, the chlorination rate was 14%, and the heterogeneity index was 1.05. The terminal voltage was 1.8 V during the electrolysis.

EXAMPLE 12

0.53 g of chlorinated polyvinyltoluene was obtained in the same manner as in Example 9 except that a mixture of m-toluene and p-vinyltoluene (m/p ratio: 60/40) was used as the vinyltoluene monomer. The chlorine content of the chlorinated polyvinyltoluene was 20.5%, the chlorination rate was 0.85, and the heterogeneity index was 1.03.

The weight average molecular weight of the raw material polyvinyltoluene was $1.8 \times 10^5$ and the heterogeneity index was 1.03. The terminal voltage was 2.1 V during the electrolysis.

EXAMPLES 13 TO 15

The solution of polymers prepared in Example 10 was used, and chlorination was performed in the same manner as in Example 10, except that the current passage time was changed, so that chlorinated p-vinyltoluene was obtained.

The results are shown in Table 2.

TABLE 2

| | Electrolytic Result | | Chlorinated Poly-p-vinyl Toluene | | | |
|---|---|---|---|---|---|---|
| Example No. | Current-Conduction Time (hr) | Terminal Voltage (V) | Yield (g) | Chlorine Content (%) | Chlorination Rate (Cl/monomer) | Heterogeneity Index (Mw/Mn) |
| 13 | 0.42 | 1.5–2.0 | 0.84 | 14.0 | 0.54 | 1.02/1 |
| 14 | 1.28 | 2.0 | 1.07 | 33.1 | 1.62 | 1.02/1 |
| 15 | 1.70 | 2.0 | 1.21 | 39.9 | 2.17 | 1.02/1 |

EXAMPLE 16

The solution of polymers prepared in Example 10 was used, and 0.92 g of chlorinated poly-p-vinyltoluene was obtained in the same manner as in Example 10 except that 15 ml of a 35 wt% sodium chloride solution in 5% sulfuric acid was used in the chlorination step.

The chlorine content was 21.8%, the chlorination rate was 0.92, and the heterogeneity index was 1.02. The terminal voltage was 2.3 V during the electrolysis.

While the invention has been described in detail and with reference to specific embodiments thereof, it will be apparent to one skilled in the art that various changes and modifications can be made therein without departing from the spirit and scope thereof.

What is claimed is:

1. A process for the preparation of a chlorinated polyvinyl aromatic compound comprising electrolyzing a polymer solution of a polyvinyl aromatic compound represented by formula (I):

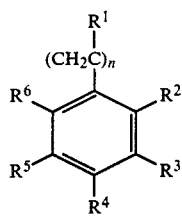

wherein each of $R^1$, $R^2$, $R^3$, $R^4$, $R^5$ and $R^6$ is selected from hydrogen and an alkyl group containing from 1 to 6 carbon atoms, and $R^4$ and $R^5$ or $R^5$ and $R^6$ can together form a ring by

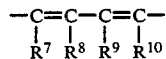

wherein each of $R^7$, $R^8$, $R^9$ and $R^{10}$ is selected from hydrogen and an alkyl group containing from 1 to 6 carbon atoms, and n is from 50 to 30,000, which polymer is dissolved in an organic solvent which is not substantially soluble in water and electrolyzing being in an aqueous solution containing chloride ions, the chlorinated polyvinyl aromatic compound prepared having substantially the same molecular weight distribution as the polyvinyl aromatic compound.

2. A process as in claim 1, wherein the polymer solution is obtained by polymerizing a vinyl aromatic compound represented by formula (II):

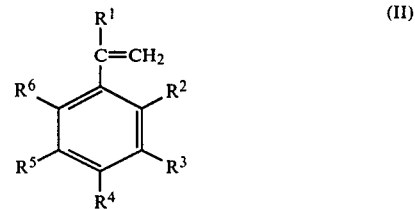

wherein each of $R^1$, $R^2$, $R^3$, $R^4$, $R^5$ and $R^6$ is selected from hydrogen and an alkyl group containing from 1 to 6 carbon atoms, and $R^4$ and $R^5$, or $R^5$ and $R^6$ can together form a ring by

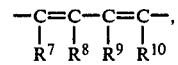

wherein each of $R^7$, $R^8$, $R^9$ and $R^{10}$ is selected from hydrogen and an alkyl group containing from 1 to 6 carbon atoms, in an organic solvent in the presence of an organometallic compound represented by the formula RM, wherein R is selected from an alkyl group, an aryl group, and an aralkyl group and M is selected from lithium, sodium and potassium.

3. A process as in claim 2, wherein the vinyl aromatic compound is vinyltoluene.

4. A process as in claim 1, wherein the amount of the aromatic organic solvent is from 20 to 500 parts by volume per weight part of the polymer.

5. A process as in claim 1, wherein the aqueous solution containing chloride ions contains from 20 to 50 wt% of an electrolyte.

6. A process as in claim 1, wherein the amount of the polymer solution is from 1 to 500 parts by volume per 100 parts by volume of the aqueous solution containing chloride ions.

* * * * *